March 31, 1959 W. B. DEAN 2,880,013
CHASSIS FRAME WITH TUBULAR SIDE SILLS FOR AUTOMOBILES
Filed June 21, 1954 9 Sheets-Sheet 1

INVENTOR
Walter B. Dean
BY
AGENT

March 31, 1959    W. B. DEAN    2,880,013
CHASSIS FRAME WITH TUBULAR SIDE SILLS FOR AUTOMOBILES
Filed June 21, 1954    9 Sheets-Sheet 2

INVENTOR
Walter B. Dean
BY Karl L. Schiff
AGENT

March 31, 1959 W. B. DEAN 2,880,013
CHASSIS FRAME WITH TUBULAR SIDE SILLS FOR AUTOMOBILES
Filed June 21, 1954 9 Sheets-Sheet 4

INVENTOR
Walter B. Dean
BY Karl L. Schiff
AGENT

March 31, 1959 W. B. DEAN 2,880,013
CHASSIS FRAME WITH TUBULAR SIDE SILLS FOR AUTOMOBILES
Filed June 21, 1954 9 Sheets-Sheet 6

INVENTOR
Walter B. Dean
BY Karl L. Schiff
AGENT

March 31, 1959  W. B. DEAN  2,880,013
CHASSIS FRAME WITH TUBULAR SIDE SILLS FOR AUTOMOBILES
Filed June 21, 1954  9 Sheets-Sheet 7

INVENTOR
Walter B. Dean
BY Karl L. Schiff
AGENT

March 31, 1959 W. B. DEAN 2,880,013
CHASSIS FRAME WITH TUBULAR SIDE SILLS FOR AUTOMOBILES
Filed June 21, 1954 9 Sheets-Sheet 8

INVENTOR
Walter B. Dean.
BY Karl H. Schiff
AGENT

March 31, 1959     W. B. DEAN     2,880,013
CHASSIS FRAME WITH TUBULAR SIDE SILLS FOR AUTOMOBILES
Filed June 21, 1954     9 Sheets-Sheet 9

INVENTOR
Walter B. Dean
BY Karl L. Schiff
AGENT

United States Patent Office 2,880,013
Patented Mar. 31, 1959

2,880,013

CHASSIS FRAME WITH TUBULAR SIDE SILLS FOR AUTOMOBILES

Walter B. Dean, Narberth, Pa., assignor to The Budd Company, Philadelphia, Pa., a corporation of Pennsylvania Application June 21, 1954, Serial No. 437,966

17 Claims. (Cl. 280—106)

The invention relates to chassis frames for automobiles having tubular side sills, particularly side sills of relatively large cross section between the front and rear wheel locations and substantially smaller cross section in the wheel or end zones.

Among the objects of the invention is a chassis frame of the indicated type which permits of convenient and economical manufacture, which combines relatively low weight with great strength, and which lends itself to the convenient attachment of running and driving gear, of the body and of other vehicle components.

A more specific object of the invention is improvement of known chassis frames of the indicated type in regard to strength, weight and price, and in regard to simplicity of design and of manufacturing and assembly procedures.

While certain known chassis frames of the indicated type start with a seam-welded cylindrical tube the ends of which are subsequently reduced in diameter by swaging, and which then are bent, the invention provides a tube formed of a blank of varying width so as to achieve from the outset a tube with varying diameter which is then bent to the desired formation in side elevation and/or plan view.

A further feature of the invention resides in the combination of the new type of tube extending from one end of the frame to a point between the front and the rear wheel locations whence it is continued by a separately made structure extending to the opposite end of the frame. This contributes to the simplicity of design and ease in manufacture and assembly inasmuch as the width of the blank and the diameter of the tube decreases toward one end only.

The above-mentioned structure adjoining the tubular side sills comprises preferably two parts which embrace the end of the tubes from opposite sides. More particularly such end structure comprises one or several mono-piece stampings forming in the respective end region portions of the side sills, the cross members and the supports for running, driving and steering gear.

Still further features of the invention deal with the design of and means for making and attaching cross members, brackets and the like to the tubular side sills.

Finally, the invention consists in channel section reinforcing members attached to the tubes so that they form lateral blisters thereon. These reinforcements are destined to be used in combination with open-type bodies. It is well known that an open-type body reinforces the chassis frame much less than a closed body. The lateral attachment of the reinforcing blister does neither decrease the road clearance nor call for a high threshold, disadvantages connected with the arrangement of certain known reinforcing structures underneath or on top of the side sills.

The above and further objects and advantages of the invention will become more fully apparent from or be disclosed in the following description and the attached drawing.

The chassis frame illustrated in Figs 1 through 10 comprises a front end structure or unit 1, a pair of tapering tubular main side sills 2, cross members 3 and 4, and brackets 5, 6 and 7. Front wheels 8, rear wheels at 9 and rear springs 10 are diagrammatically indicated in Figs. 1 and 2.

One may roughly distinguish between three longitudinal zones or regions of the frame: the front end or front wheel region F, the middle or between-the-wheels region M, and the rear end or rear wheel region R.

The front end unit 1 is approximately restricted to the front wheel region F. It comprises a hollow section, mono-piece upper stamping 11 and a lower closing plate or stamping 12, and presents forward side sill portions 13 and cross members 14, 15. The front end unit 1 substantially corresponds to the structure forming the subject matter of co-pending application Serial No. 438,144, filed June 21, 1954, Alexander R. Lindsay for "Automobile Chassis or Underframe Structure" which is a continuation-in-part of an original application Ser. No. 358,315, now abandoned, having the same inventor and title, filed May 29, 1953.

Each side sill 2 is a tube extending in one piece from front end unit 1 through the middle region M and the rear wheel region R, to the exclusion of the other end region F.

Each of these tubes 2 is of relatively large diameter in and adjoining front unit 1 but decreasing in diameter toward the rear end only, so as to correspond approximately to the great strength required in middle region M and the reduced strength sufficient in rear wheels region R.

Figures 11, 12:
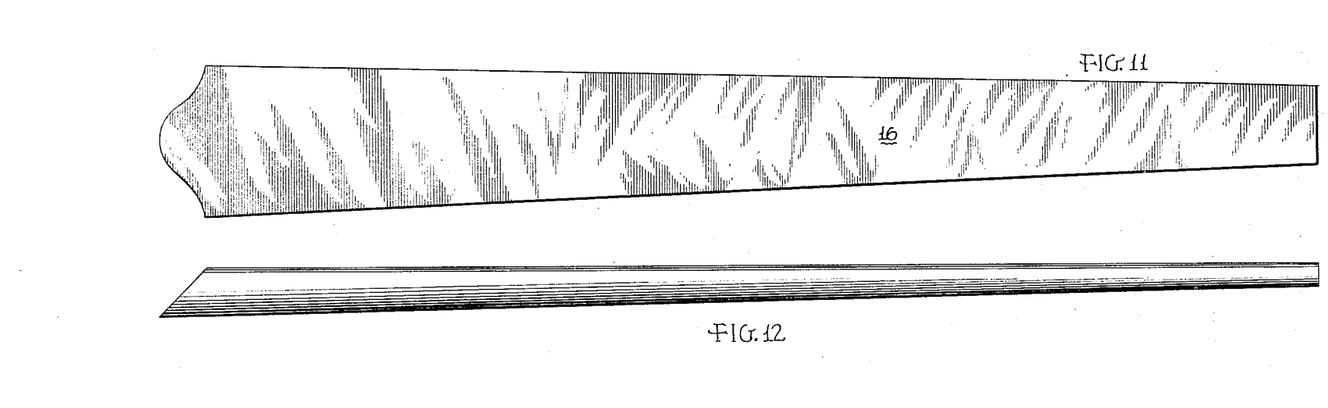
Figure 11 is a plan view of a blank for forming one of the side sills.
Figure 12 is a view of a tube formed of the blank shown in Fig. 11.
Figure 13:
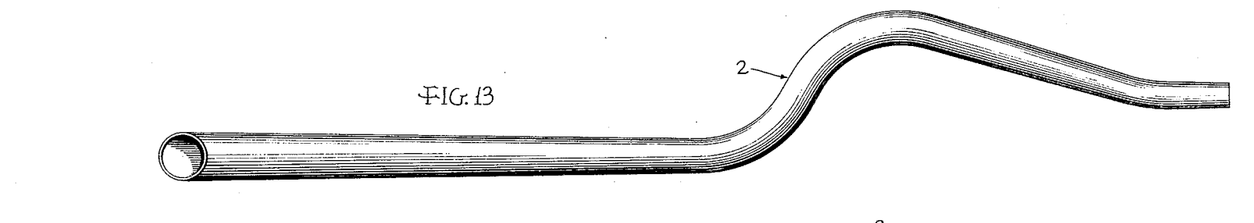
Figures 13 and 14 are a side elevation and plan view respectively of the same tube after being bent into the shape of one of the main side sills.
Figure 14:
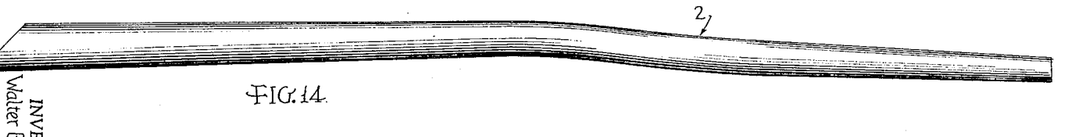

Each tube is formed of a single plate tapering blank 16, as shown for instance in Fig. 11. The margins of blank 16, upon being formed into a tube, are connected by a seam weld 17, and the tube is then brought into the desired configuration and shape. Advantageous ways and means of forming, welding and shaping the tubes will be described later on in connection with the respective figures of the drawing.

Figures 15, 16:
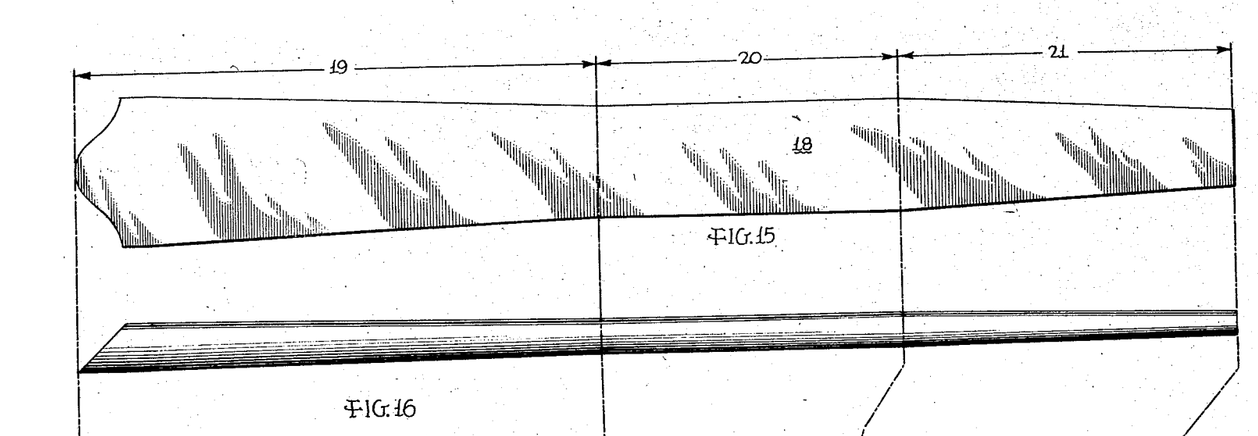
Figures 15, 16 and 17 are views corresponding to Figs. 11, 12 and 13 of a modification.
Figure 17:
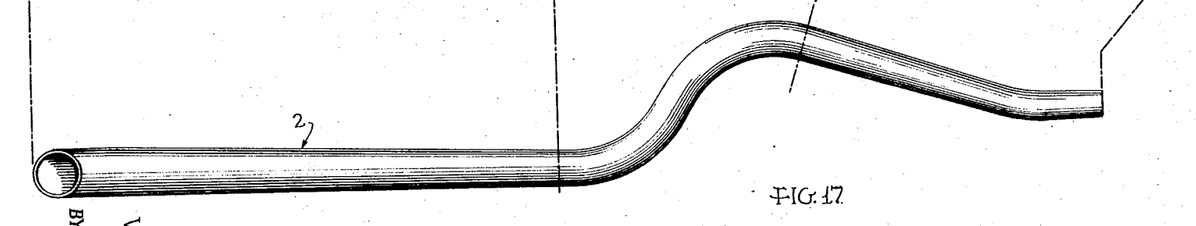
Figure 18:
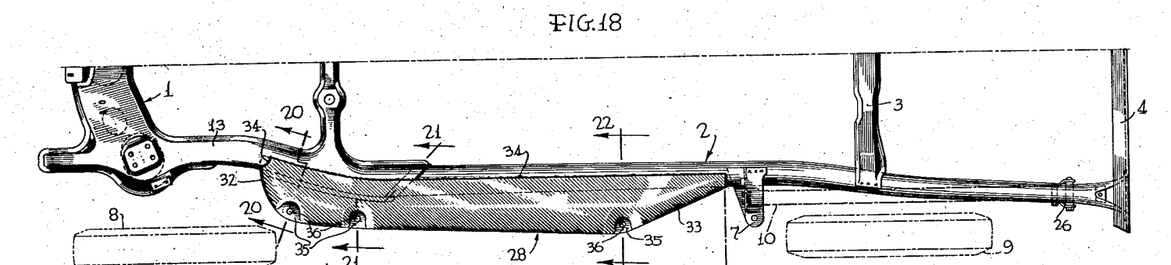
Figure 18 is a plan view of one-half side of a frame corresponding to Fig. 1 but provided with an additional reinforcement.
Figure 19:
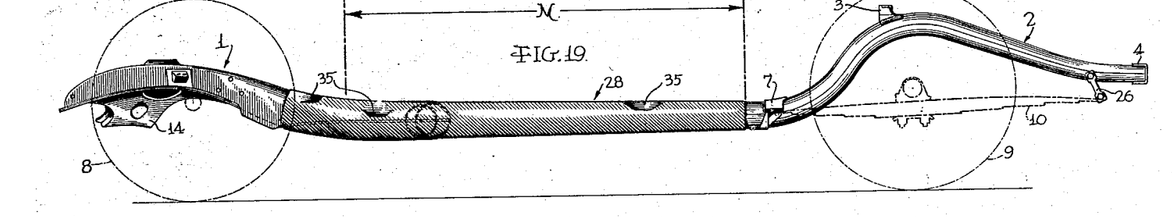
Figure 19 is a side elevation of the frame per Fig. 18.
Figure 20:
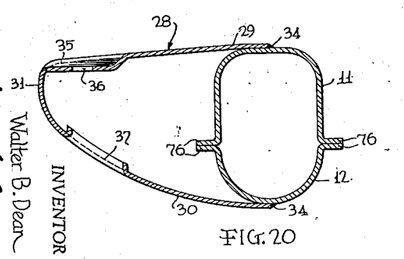
Figures 20, 21 and 22 are fragmentary sections on a larger scale taken along the correspondingly numbered section lines of Fig. 19.
Figure 21:
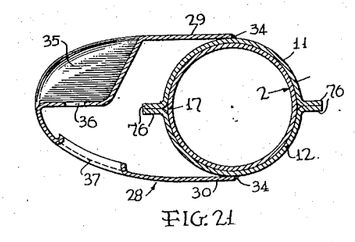
Figure 22:
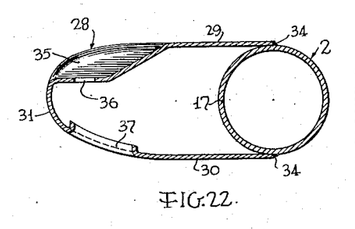

While Figs. 11 through 14 disclose a blank and a tubular side sill having constant taper throughout its length, Figs. 15 to 17 disclose a modification in which blank 18 has tapering end regions 19 and 21 and a parallel-sided intermediate region 20. The end regions 19 and 21 correspond (as shown in Fig. 17) to the straight or nearly straight portions of the finished sill whereas the parallel-sided region 20 corresponds to the sharply curved kick-up region of the finished sill. It will also be noted that region 19 coincides approximately with region M, and that regions 20, 21 together correspond approximately to region R indicated in Figs. 1 and 2.

The front ends of the sills 2 are telescopingly received in the tubular rear ends of side sill portions 13 of the front unit 1 and are secured thereto by fusion welding, e.g. arc welding, at 22. See Figs. 5 to 7. So as to increase the length and thereby the strength of the connection, the adjoining margins of sills 2 and sill portions 13 are arranged at an angle to the longitudinal direction of the frame.

The rear ends of the tubes 2 are bifurcated at 23 and provided with flanges or tongues 24 which are connected with rear cross brace 4. The bifurcation is reinforced by an insert or gusset 25. The formation of the bifurcation will be described later on in connection with the respective figures of the drawing.

Figure 44:
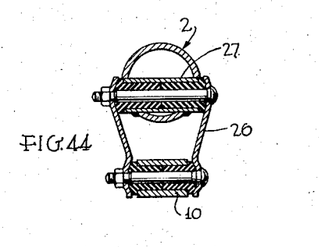
Figure 44 is a section along line 44—44 of Fig. 2 through one of the spring hanger attachments for the rear spring.

Rear spring hanger 26 of rear spring 10 is arranged shortly in front of the bifurcation 23. The upper bearing of the hanger comprises a short tube 27 extending through holes in sill 2 and secured therein by welding, Fig. 44.

The frame illustrated in Figs. 18 to 22 differs from the frame illustrated in the preceding figures by the addition of lateral reinforcements or blisters 28 and the omission of brackets 5 and 6. The blisters 28 serve primarily for increasing the strength of the frame when used for open-type bodies which, as known, contribute considerably less to the strength of the complete car than it is the case with closed bodies (no body shown in drawing). The lateral arrangement of these reinforcements neither decreases the road clearance nor does it raise the height of the threshold of the body or of the body as a whole.

Each blister 28 consists of an inwardly facing channel section having a top wall or leg 29, a bottom wall or leg 30 and an outer wall or web 31. Outer wall 31 veers inwardly in the front at 32 and in the rear at 33 so as to adjoin the outside of sill members 2 and 13 and to close the ends of channel section 28. The margins of top and bottom wall 29, 30 overlap top and bottom of main sill 2 and sill portion 13 of the front unit and are welded thereto at 34 so as to form therewith a laterally extending closed box section extending over and being mainly restricted to mid region M between front and rear wheels 8, 9.

Recesses 35 formed along the outer margin of the blisters 28 take the place of brackets 5, 6 of the first embodiment in that they provide supports for the body. Attachment bolts (not shown) can pass through holes 36 in the recesses and are accessible through registering holes 37 provided in bottom wall 30.

One way and means of forming the tubular side sill members 2 is illustrated in Figs. 23 to 30.

Figures 23, 24:
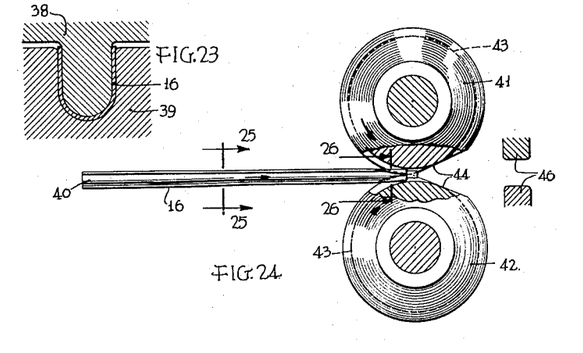
Figure 23 is a diagrammatic section through a forming die and a blank per Figures 11 or 15 illustrating a first forming operation.
Figure 24 is a diagrammatic, fragmentarily sectioned, side elevation of rollers for forming a tube out of the blank shown in Fig. 23.
Figure 25:
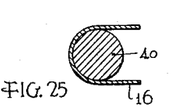
Figures 25 and 26 are fragmentary sections on a larger scale along the correspondingly numbered lines of Fig. 24.
Figure 26:
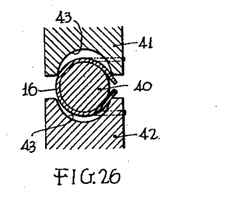
Figure 27:
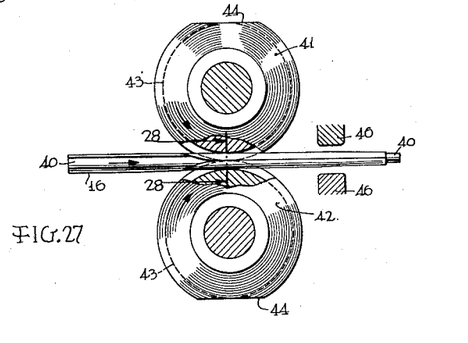
Figure 27 is a view similar to Fig. 24 showing an advanced stage of the forming operation.
Figure 28:
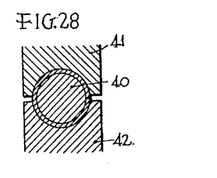
Figure 28 is a fragmentary, larger scale section along line 28—28 of Fig. 27.
Figure 29:
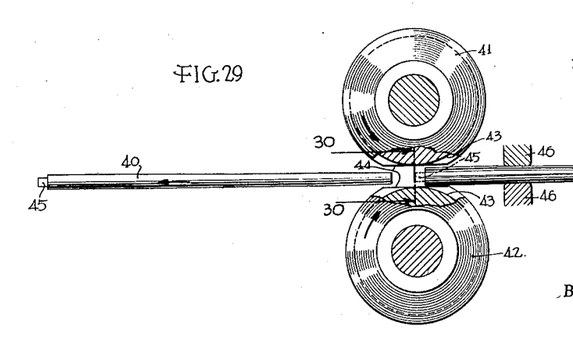
Figure 29 is a further view corresponding to Figs. 24 and 27 illustrating the completion of the forming operation and the withdrawal of a mandrel.
Figure 30:
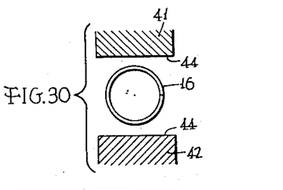
Figure 30 is a larger scale section along line 30—30 of Fig. 29.

After blank sheet 16 (or 18) as shown in Fig. 11 (or 15) has been cut of sheet steel, it is preformed in a press between dies 38, 39, as shown in Fig. 23, into a U-section matching the diameter of the tube with its taper, Fig. 12 (or with its tapered and straight portions, Fig. 15).

The U-shaped pressing is placed over a mandrel 40 corresponding in shape and diameter to the inner shape and diameter of the finished tube. Pressing and mandrel are then fed into forming rolls 41, 42 which are grooved and close the U-section into a tube. Different steps of this procedure are shown in Figs. 24 to 28. The rolls are of such diameter that they require less than one revolution in forming a tube of the required length; thus the grooves 43 are tapered (or alternately tapered and parallel-sided) to match the shape of the tube per Fig. 12 (or 15).

A flat 44 is provided on each roll so that after forming is completed a sprag 45 may be inserted and the mandrel 40 may be withdrawn while holding the tube between jaws 46. Due to a certain springback of the tube the withdrawal of the mandrel is easy.

Figures 31, 32:
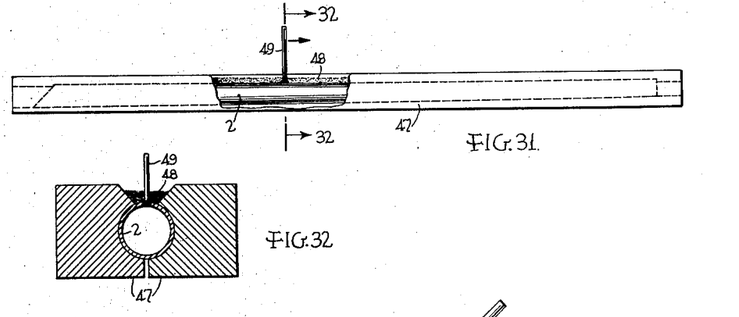
Figure 31 is a diagrammatic side elevation of tools and procedure for welding the seam of the tube.
Figure 32 is a larger scale, diagrammatic section along line 32—32 of Fig. 31.

Tube 2 is next held between the two halves of a welding fixture 47, the halves having a cavity shaped between them corresponding to the outer form of the tube. This fixture clamps the tube so as to close the joint between its margins. The tube margins then are connected by automatic submerged arc welding resulting in the previously-mentioned weld 17. Figs. 31 and 32 diagrammatically illustrate welding fixture 47 with groove 48 in which welding electrode 49 advances. It will be understood that other types of welding can be used. For instance, the margins of the tube may overlap each other and may be connected by electric resistance welding.

The tube is now ready for bending. It may be mentioned here that the bending is preferably conducted so that weld seam 17 will be located in the neutral zone of the sill after its installation in a chassis frame; such location of seam 17 is illustrated in many cross sections such as in Figs. 7, 21, 36 and 38. The neutral zone, axis or plane, is the zone which divides those portions of the sill which are respectively in compression or tension when the sill is subjected to bending action in a vertical plane, that is the neutral zone is the zone of zero stress.

Figure 33:
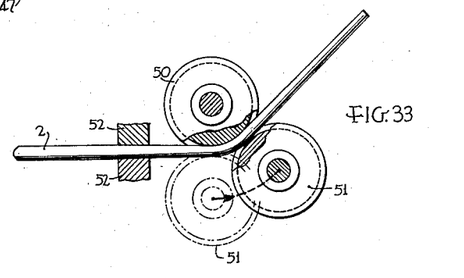
Figures 33 and 34 are diagrammatic, fragmentarily sectionalized, side elevations illustrating equipment and procedure for transforming a straight tapering tube per Figs. 12 or 16 into a tube provided with the rear wheel kick-up per Figs. 13 or 17.
Figure 34:
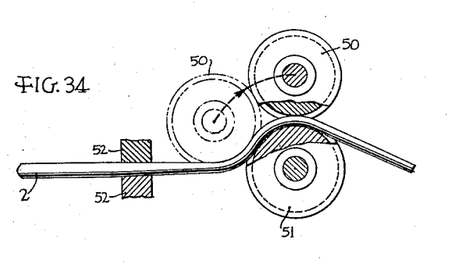

The bending of the tube may be done as illustrated in Figs. 33, 34 by means of a pair of grooved bending rollers 50, 51. The radius of these rollers matches the radius required in the respective bend and their grooves preferably correspond to shape and cross-section of the tube regions to be bent though they are slightly smaller than the tube diameter to prevent wrinkling during the bending process.

Rollers 50, 51 are pressed together, and tube 2 is placed between them and held by clamps 52 just in front of the bend. Bottom roller 51 is then pivoted about the center of upper roller 50 forming the first bend of the kick-up, Fig. 33. Bottom roller 51 is then locked in position and top roll 50 is pivoted about the center of the bottom roller to form the knee of the kick-up, Fig. 34.

Figure 35:
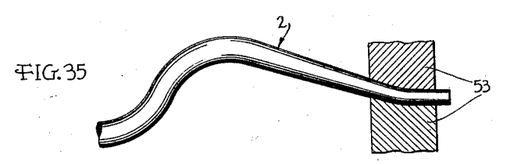
Figure 35 is a fragmentary section through dies for forming a shallow bend near the rear end of the tapering tube.

The slight bend near the rear end of the tube may be formed between correspondingly shaped dies 53 in a forming press (not shown), Fig. 35.

Figure 43:
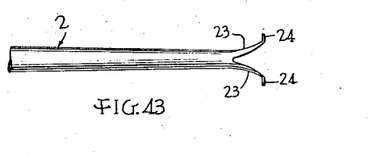
Figure 43 is a fragmentary plan view on a smaller scale of a side sill with its flared rear end.

The formation of the bifurcation at the tail end of tube 2 is diagrammatically illustrated in Figs. 40 to 43. Top and bottom of the tube each are provided with a slot 54 by means of pincer-like cutter 55 diagrammatically illustrated in cross section in Fig. 40. The end of the tube is then held in a die 56 (Figs. 41 and 42) having a conically widening recess 57. A conical die 58 is now pressed into the open end of the tube so as to form the bifurcation 23 and the flanges 24. The rear end is now finished as shown in Fig. 43 and ready for connection to the rear cross member 4.

Cross brace 3 and brackets 6, 7 are conveniently attached by their formation and by the procedures best illustrated in Figs. 8 to 10 and 36 to 39. The aim is to allow the attachment by means of electric resistance welding even though the aforesaid members embrace the respective tube near to or fully over 80° of its circumference.

Cross brace 3 consists of a main member 59 and a lower supplemental member 60 at each end. Members 59 and 60 are hat sections facing each other and having marginal flanges 61, 62 respectively. Flange 61 of the upper member embraces tube 2 over close to 90° of its circumference and flange 62 of supplement 60 embraces the tube over an adjoining approximate 90°. For installing the brace 3, its components 59 and 60 are first left unattached to each other. They are put in place on the tube and secured to it by spot or projection welds with the help of welding electrodes 63. Inasmuch as the members 59 and 60 are not yet rigidly connected with each other, the flanges 61 and 62 can be tightly squeezed against the tube independently of each other. As a last step the members 59 and 60 are connected with each other by ordinary spot weld electrodes 64 gripping between them the overlapping portions of the flanges 61, 62, which extend from the tube toward the center of the frame.

Figure 8:
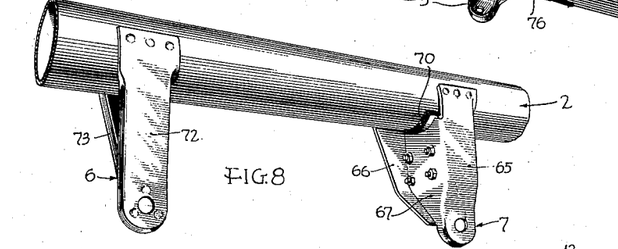
Figure 8 is a fragmentary perspective of one of the side sills similar to but on a larger scale than the part of the sill in the region surrounded by dot-and-dash line 8 in Fig. 3.
Figure 9:
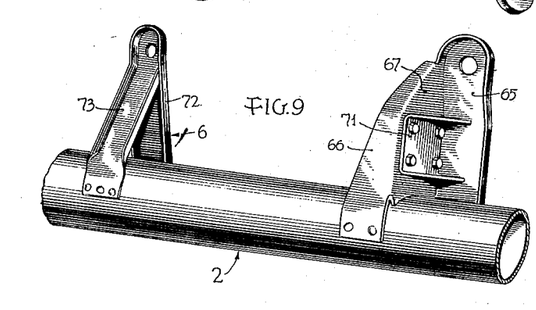
Figure 9 is a perspective of the parts shown in Fig. 8 but seen from the rear and from underneath.
Figure 10:
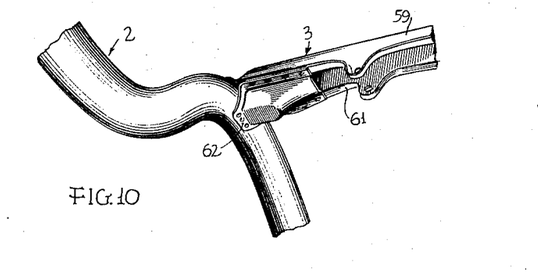
Figure 10 is a large scale, fragmentary underside perspective of the connection between one side sill and a cross member in the region surrounded by dot-and-dash line 10 in Fig. 3.
Figure 36:
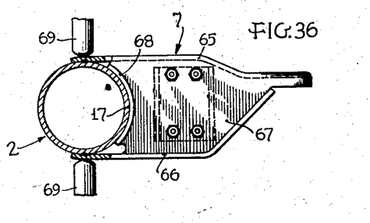
Figure 36 is a transverse section and elevation, diagrammatically illustrating the procedure of securing the bracket shown on the right hand in Figs. 8 and 9 to the main side sill.

Bracket 7, Figs. 9 and 36, is a Z-section whose legs 65, 66 overlap tube 2 from opposite sides and whose web 67 abuts the intervening portion of the tube by means of a flange 68. The overlapping portions of the legs 65, 66 have enough resiliency relative to each other, and the entire bracket may tilt to a certain extent so as to allow intimate contact with the tube when the legs are secured to the latter by means of welding electrodes 69, Fig. 36. Flange 38 may subsequently be secured to the tube by gas or arc welds 70, Fig. 8. Bracket 7 is formed at 71 (Fig. 9) for the attachment of the front end of rear spring 10.

Figure 37:
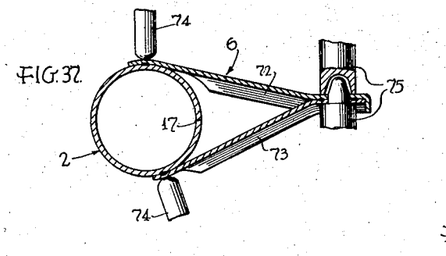
Figure 37 is a view similar to Fig. 36 illustrating the attachment of the bracket shown on the left hand in Figs. 8 and 9.
Figure 38:
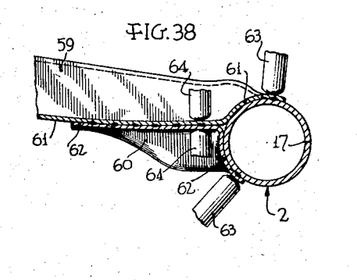
Figure 38 is a cross section diagrammatically illustrating the connection between side sill and cross member shown in Fig. 10.

Bracket 6, Figs. 8, 9 and 37 consists of two channel sections 72 and 73, the ends of whose bottom walls overlap tube 2 and are secured to it with the help of welding electrodes 74, while their outer ends overlappingly engage each other and are welded together by electrodes 75. Members of this bracket have enough resiliency to permit intimate contact with the tube while at the same time establishing, upon completion of the connection, a very rigid bracket.

The rear ones of brackets 5 are similarly designed and attached to the front end unit as brackets 6. The forward brackets 5 do not offer attachment problems inasmuch as they surround the tubular portions of the front unit over less than 90°; these brackets 5 may be attached also to flanges 76 provided on and connecting the front end stampings 11, 12.

Figure 39:
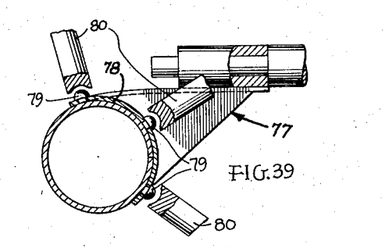
Figure 39 is a view similar to Fig. 36, illustrating another procedure for securing a bracket or cross member to a tubular sill.
Figure 40:
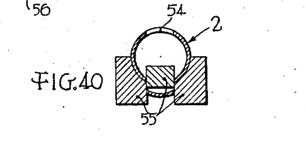
Figure 40 is a transverse section diagrammatically illustrating slotting the rear end of a side sill.
Figure 41:
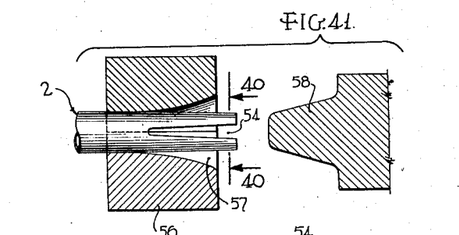
Figures 41 and 42 are diagrammatic sections illustrating flaring and flanging the rear end of a sill.
Figure 42:
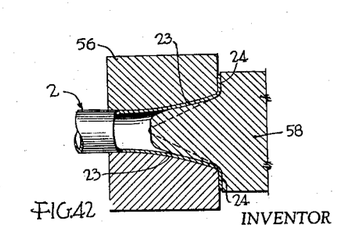

Another design and attachment procedure for a bracket is illustrated in Fig. 39. This bracket 77 has a flange 78 embracing tube 2 over about 180°. Flange 77 is provided along its length with a number of holes receiving headed plugs 79. The length of these plugs is just about or slightly longer than the thickness of flange 78. Upon admitting a welding current through electrodes 80, simultaneously or successively to the different plugs 79, the latter are fused to tube 2. Evidently, the different plugs 79 are movable independently of each other and their arrangement in different radial direction cannot interfere with their movement and their firm engagement with the tube.

Figure 1:
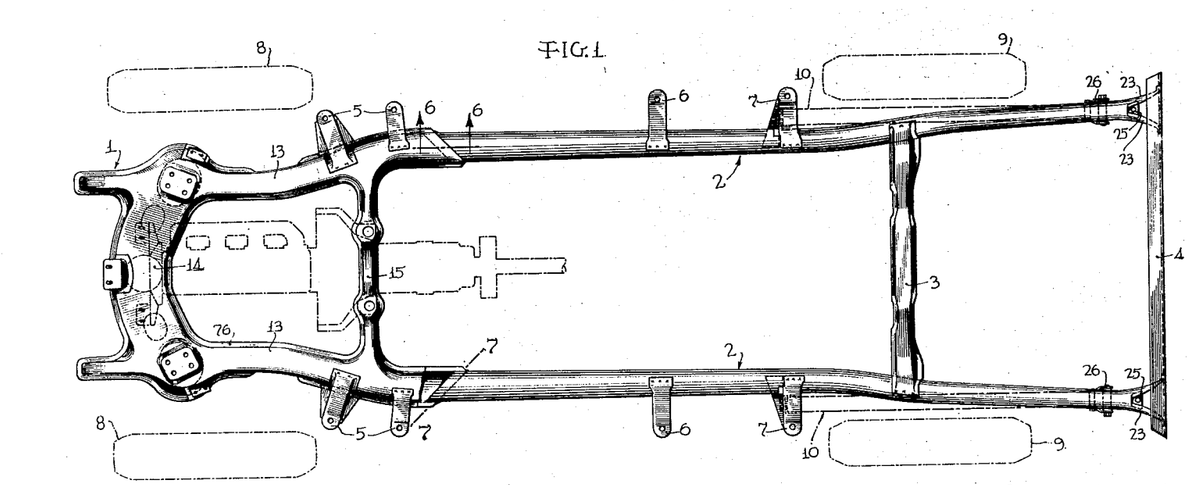
Figure 1 is a plan view of one embodiment of the new frame diagrammatically indicating the location of running wheels and rear springs.
Figure 2:
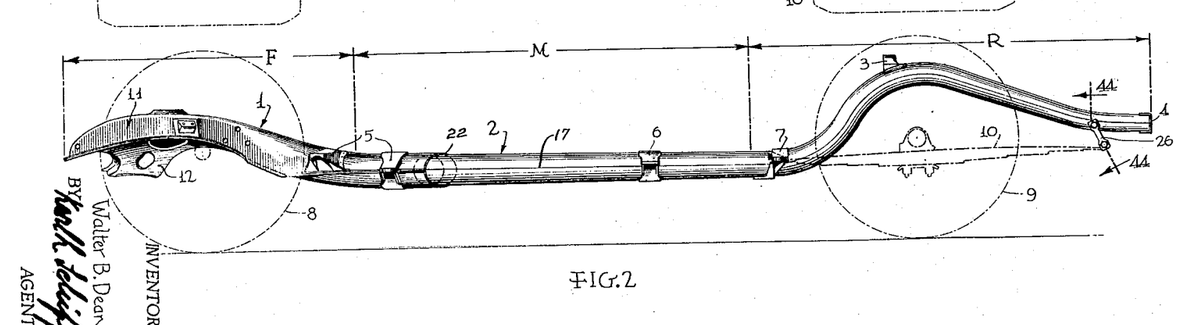
Figure 2 is a side elevation of the frame.
Figures 3, 4:
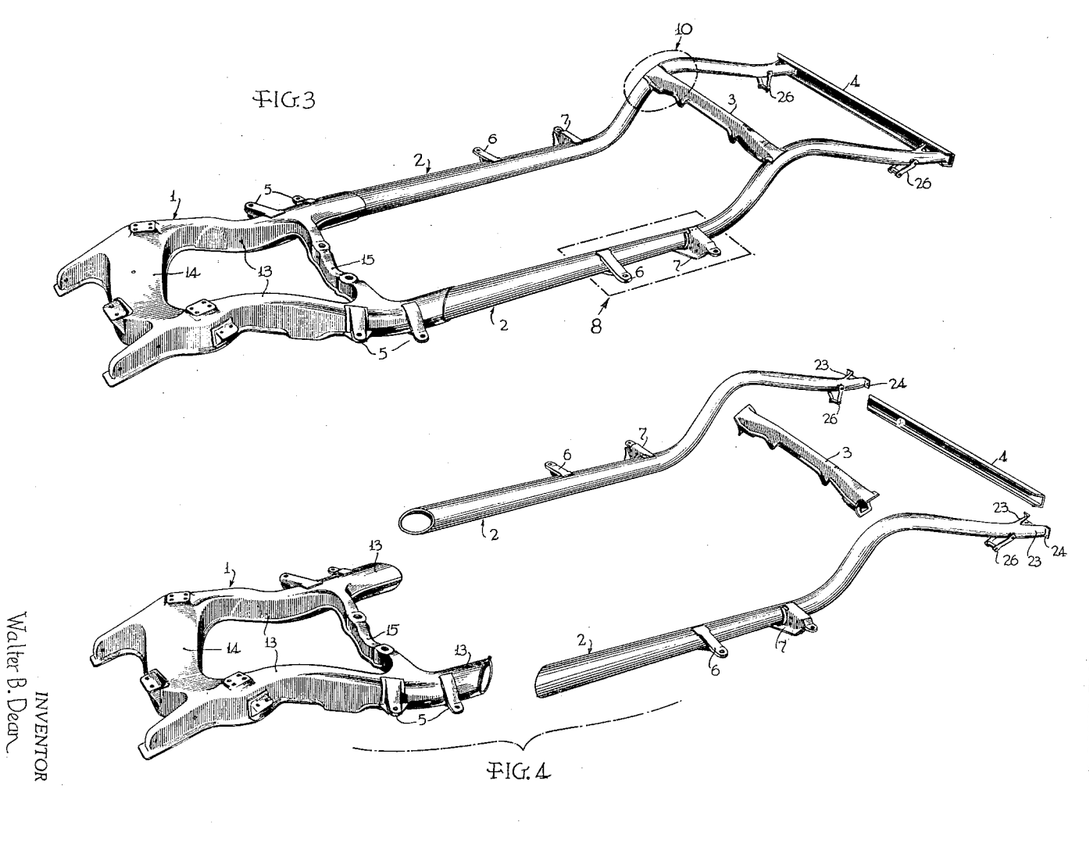
Figure 3 is a three-quarter front perspective of the frame.
Figure 4 is an exploded three-quarter front perspective of the main components of the frame.
Figure 5:
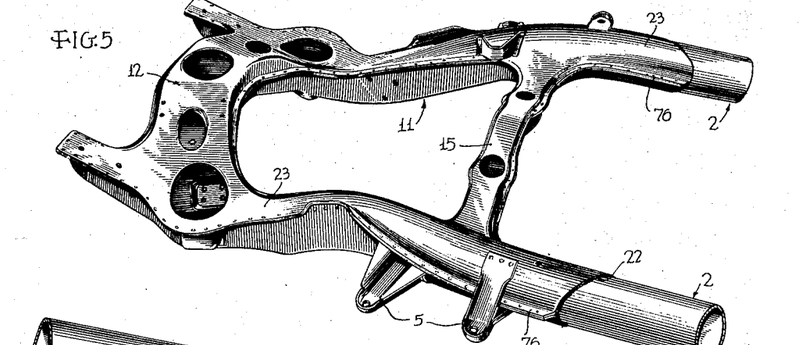
Figure 5 is a fragmentary underside perspective of the front end of the frame.
Figure 6:
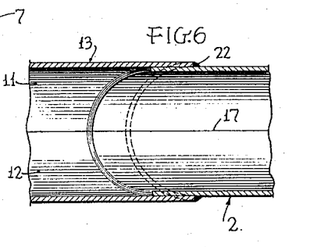
Figures 6 and 7 are fragmentary sections on a larger scale of the connection between the front end unit and a main side sill, the sections taken along lines 6—6 and 7—7, respectively, of Fig. 1.
Figure 7:
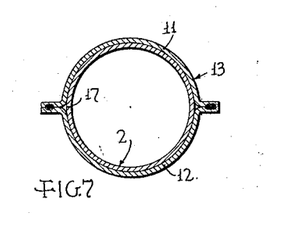

The new frame may be shipped as a complete unit shown in Figs. 1 to 3 or 18 and 19, or it may be shipped knocked-down by leaving separate the component parts illustrated in Fig. 4 until they arrive at the final assembly location. These parts, intended for separate shipment and requiring a minimum of space for stacking, are the front unit 1, the side sills 2 and the individual cross members 3 and 4. All or some of the brackets 5 to 7 may be pre-assembled with the respective units or they may be attached in final assembly so as to permit variations for different types of models. The design and procedure of the connection between the different units, as disclosed herein, is particularly suitable for the system of shipping the frame knocked-down and of assembling its components at its ultimate location, because the connections are conveniently accessible and made with relatively simple tools and fixtures.

Summing up some of the outstanding advantages of the new frame over comparable known designs:

It has increased stiffness.

It is of lighter weight.

It is more easily manufactured and assembled to accurate dimensions and

It is less expensive.

The invention avoids the useless accumulation of material and weight which go inescapably with the reduction in diameter by swaging of the known frames referred to hereinbefore. The sills of the new frame are more easily bent to the desired configuration due to the absence of increased wall thickness. The material and the weld of the tube need no more be selected and made so as to withstand the severe stresses of swaging. The stress on the weld of the new tube during welding is kept at a minimum due to the arrangement of the seam in the neutral plane which coincides approximately with the middle line of the bends.

While several forms of the invention, and several means and procedures for making and assembling the new frame are illustrated and described it will be understood that the invention is susceptible to modifications and to adaptations for different outlays of the frame, which may be predicated by different sizes and types of cars.

What is claimed is:

1. In a chassis frame for automobiles having a mid-region longitudinally adjoined by front and rear wheel regions: a pair of tubular side sills extending from one end of the frame through a first one of said wheel regions into the mid-region; a frame structure adjoining and connected with said tubes and extending through the other one of said wheel regions to the opposite end of the frame; each of said tubes being formed of a single sheet metal blank diminishing in width toward one end and having its longitudinal edges joined by a single weld seam, having in said first wheel region a smaller diameter than in said mid-region; and having a bend in said first wheel region while being substantially straight in said mid-region.

2. A frame according to claim 1 in which said adjoining frame structure comprises two stampings, said stampings each having a half circular end portion and being connected with each other so as to form together a full circular end portion, the ends of the tubular side sills telescopingly fitting into said tubular end portions and being rigidly connected therewith.

3. A frame according to claim 1 in which the weld seam of each tube extends along a neutral plane substantially midway between the top and bottom thereof.

4. In a chassis frame for automobiles having a mid-region longitudinally adjoined by front and rear wheel regions: a pair of tubular side sills extending through said mid-region and through one only of said wheel regions; each of said tubes being formed of a single sheet metal blank diminishing in width toward at least one end and having its margins joined by a single weld seam, having in said wheel region a smaller diameter than in said mid-region, and having a bend in said wheel region while being substantially straight in said mid-region.

5. In a chassis frame for automobiles having a mid-region longitudinally adjoined by front and rear wheel regions: a pair of conical, tubular side sills extending from one end of the frame through a first one of said wheel regions into the mid-region; a frame structure adjoining and connected with said tubes and extending through the other one of said wheel regions to the opposite end of the frame; each of said tubes being formed of a single sheet metal blank having straight longitudinal margins converging toward each other from one end to other and having said margins joined by a single weld seam, having in said first wheel region a smaller diameter than in said mid-region, and having a bend in said first wheel region while being substantially straight in said mid-region.

6. In a chassis frame for automobiles having a mid-region longitudinally adjoined by front and rear wheel regions: a pair of tubular side sills extending from one end of the frame through a first one of said wheel regions into the mid-region; a frame structure adjoining and connected with said tubes and extending through the other one of said wheel regions to the opposite end of the frame; each of said tubes being formed of a single sheet metal blank having end portions diminishing in width toward one end and a parallel-sided mid-portion, and having its margins joined by a single weld seam, having in said first wheel region a smaller diameter than in said mid-region, and having upwardly bent kick-up in the region of said parallel-sided mid-portion while being substantially straight in said mid-region.

7. A side sill in the form of a tube, for automibile chassis frames adapted to extend through a mid-region and an adjoining wheel region thereof, said tube being formed of a single sheet metal blank diminishing in width toward one end and having its margins joined by a single weld seam so as to provide the tube with a smaller diameter in the wheel region than in the mid-region, said tube having a kick-up in the wheel region while being substantially straight in said mid-region, said weld seams being arranged substantially in the neutral zone of the bend forming the kick-up.

8. A side sill, according to claim 7, formed of a sheet metal blank having straight side margins converging toward each other in at least one part and running parallel to each other in another part of its length, whereby to provide a cylindrical portion for part of the sill length and a conical portion for an adjoining part of the sill length, said cylindrical portion being bent transversely to provide the wheel kick-up.

9. A chassis frame side sill of tubular cross-section having an end portion of reduced diameter, said end portion being vertically split and laterally flared for connection to a cross member at relatively widely spaced points.

10. In a chassis frame for automobiles having side sills, the combination with said sills of inwardly facing channel section members laterally projecting beyond and secured to said sills so as to reinforce them in the regions between front and rear wheel regions.

11. In a chassis frame for automobiles having tubular side sills, the combination with said sills of inwardly facing channel section members laterally projecting beyond and secured to said tubular sills so as to reinforce them in the regions between front and rear wheel regions.

12. In a chassis frame, according to claim 10, in which said channel sections are formed with body attachment seats.

13. In a combination of a tubular chassis sill and a member connected to and projecting from said sill, said member comprising two legs shaped to embrace the tubular sill from opposite sides, said member having its legs formed as two separately made pieces, one of said pieces extending between opposite tubular side sills of a chassis frame and combined at each of its ends with the other one of said pieces, said pieces embracing together about one-half of the circumference of said tubular sills, said pieces being rigidly secured to said tubular sills and to each other.

14. In a combination of a tubular chassis sill and a member connected to and projecting from said sill, said member comprising two hat section pieces facing toward each other and having mutually engaging flanges, the ends of said pieces being shaped and flanged so as to fit together over about one-half of the circumference of the tubular sill, said flanges being secured respectively to said tubular sill and to each other.

15. In a combination of a tubular chassis sill and a member connected to and projecting from said sill, said member being a section comprising two legs interconnected by a web, said legs having portions projecting beyond said web, said web having a part-circle shaped margin between said projecting leg portions, said projecting portions of the legs overlapping and being secured to opposite sides of said tubular sill, and said margin of the web fitting against the tubular sill between said legs and being secured thereto such as by fusion welding.

16. In a combination of a tubular chassis sill and a member connected to and projecting from said sill, said member having portions overlappingly engaging said tubular sill over approximately one-half of its circumference, said portions being provided with holes, weld rivets placed in said holes and fused by electric resistance heating to said tubular sill, said rivets extending radially to said tubular sill's circumference in directions of less than 90° from each other.

17. In a chassis frame, according to claim 11, in which said channel sections are formed with body attachment seats.

References Cited in the file of this patent

UNITED STATES PATENTS

| | | |
|---|---|---|
| 1,343,682 | Richmond | June 15, 1920 |
| 1,809,606 | Strong | June 9, 1931 |
| 1,867,341 | Werdehoff | July 12, 1932 |
| 2,027,898 | Broulheit | Jan. 14, 1936 |
| 2,105,713 | Werdehoff | Jan. 18, 1938 |
| 2,118,448 | Wallace | May 24, 1938 |
| 2,119,193 | Avery | May 31, 1938 |
| 2,192,560 | Riemenschneider | Mar. 5, 1940 |
| 2,196,497 | Heman | Apr. 9, 1940 |
| 2,229,371 | Chayne | Jan. 21, 1941 |
| 2,297,123 | Almdale | Sept. 29, 1942 |
| 2,747,887 | Schilberg | May 29, 1956 |